Nov. 26, 1963   P. B. MARTENS   3,112,144
INSTRUMENT MOUNTING AND HOUSING
Filed Jan. 9, 1962   3 Sheets-Sheet 1

Paul B. Martens
INVENTOR.

BY *[signatures]*
Attorneys

Nov. 26, 1963 — P. B. MARTENS — 3,112,144
INSTRUMENT MOUNTING AND HOUSING
Filed Jan. 9, 1962 — 3 Sheets-Sheet 2
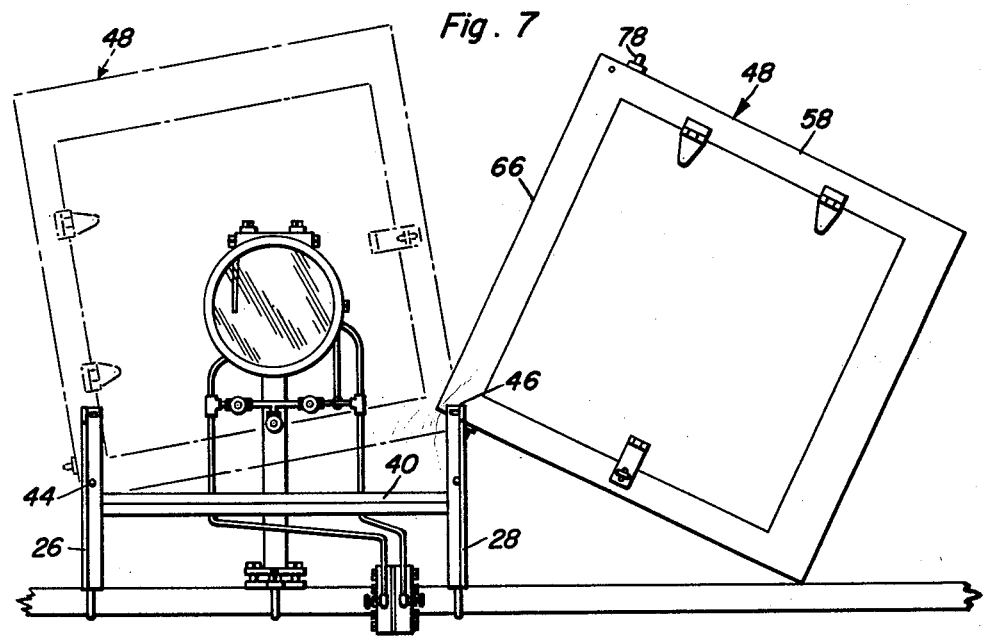
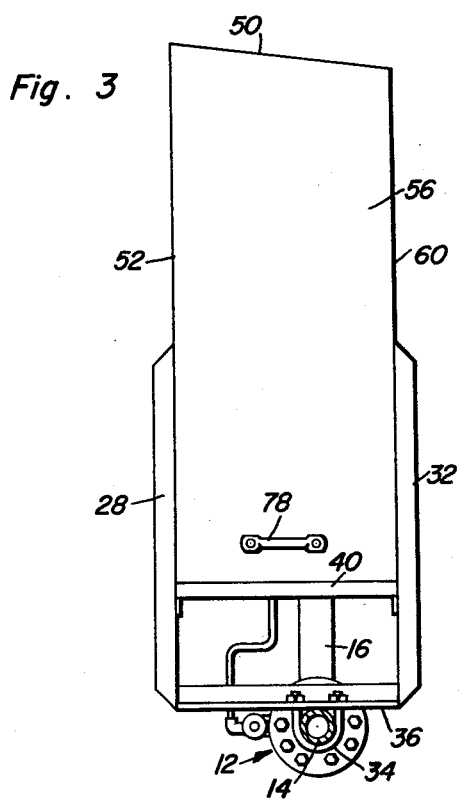
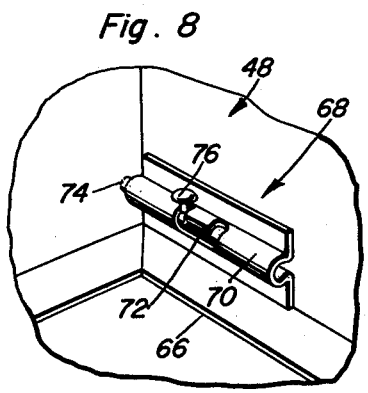
Paul B. Martens
INVENTOR.

Nov. 26, 1963 P. B. MARTENS 3,112,144
INSTRUMENT MOUNTING AND HOUSING
Filed Jan. 9, 1962 3 Sheets-Sheet 3

Paul B. Martens
INVENTOR.

BY
Attorneys

United States Patent Office 3,112,144
Patented Nov. 26, 1963

3,112,144
INSTRUMENT MOUNTING AND HOUSING
Paul B. Martens, 450 Lantana, Corpus Christi, Tex.
Filed Jan. 9, 1962, Ser. No. 165,149
7 Claims. (Cl. 312—284)

This invention relates to a protective housing construction for instruments or the like and more particularly to a protective housing installation for orifice type meters for fluid flow lines commonly utilized in the petroleum industry.

A primary object of the present invention therefore, is to provide a protective enclosure for orifice meters of the type requiring frequent re-calibration, chart drive repair, part replacement and other servicing.

Another object of the present invention is to provide a protective enclosure for flow meters or the like which may be readily displaced without complete disassembly to a meter exposing position providing an unobstructed work area for servicing of the meter.

An additional object of the present invention in accordance with the foregoing object, is to provide a protective enclosure for meters or the like capable of being easily displaced to a meter exposing position in connection with meters of different sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a side elevational view of the meter enclosure installation illustrated in FIGURE 2.

FIGURE 7 is a front elevational view of the enclosure assembly with the enclosure assembly illustrated in a meter exposing position with respect to an upper supported position.

FIGURE 8 is a partial perspective view of a releasable pivot securing assembly associated with the meter enclosure.

Figure 1:
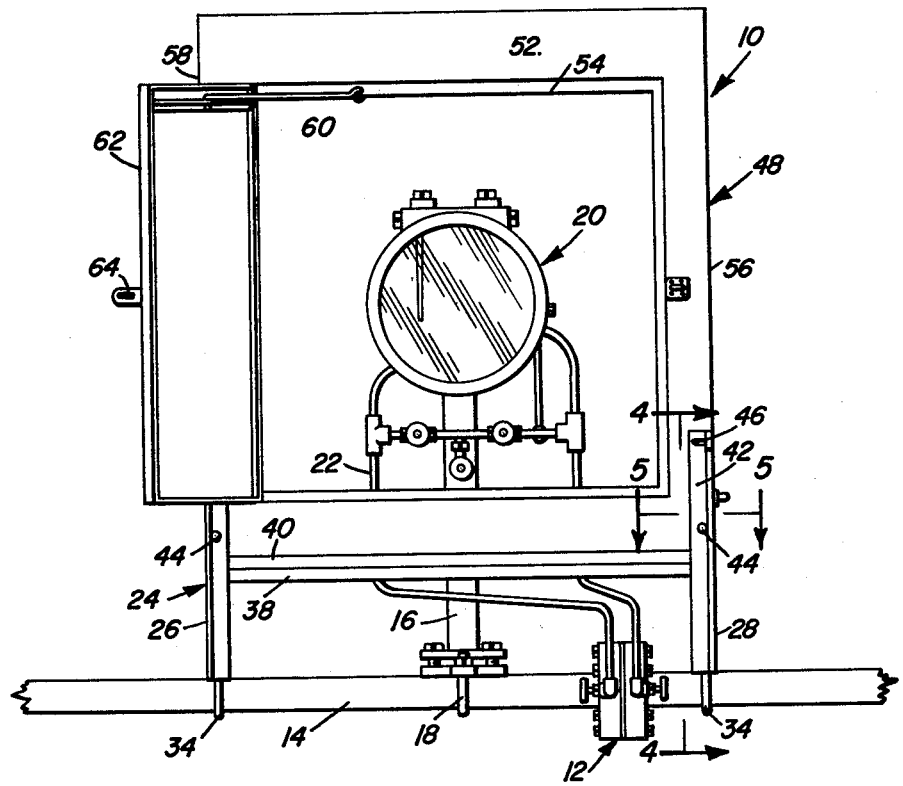
FIGURE 1 is a front elevational view of an installed protective meter enclosure having an inspection door in open position.
Figure 2:
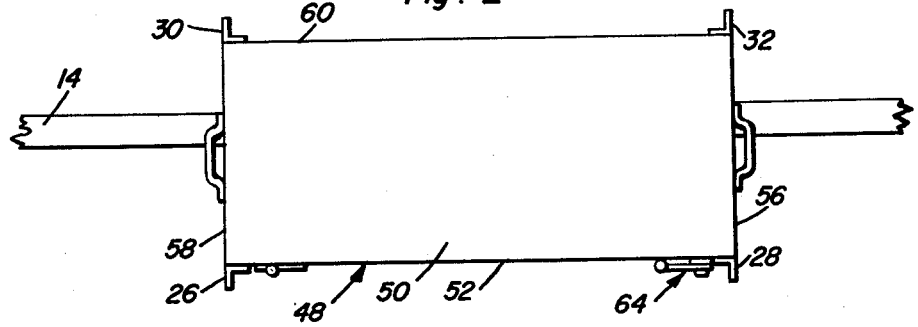
FIGURE 2 is a top plan view of the meter enclosure installation with the inspection door in closed position.

Referring now to the drawings in detail, FIGURES 1, 2 and 3 illustrate a typical meter installation for the enclosure assembly of the present invention generally referred to by reference numeral 10. The meter installation with which the present invention is concerned, involves the mounting of an orifice type flowmeter 12 in a fluid flow line 14. A meter mounting standard 16 is therefore secured to the flow line 14 by means of any suitable attaching structure such as the U-bolt 18 for support thereabove of a meter recording device generally referred to by reference numeral 20. A manifold and connecting tube assembly is installed between the orifice fitting 12 and the meter recording device 20. The enclosure assembly 10 is therefore provided for the purpose of protecting the apparatus associated with the flowmeter and in particular the meter recording device 20 and associated connections and controls. As hereinbefore indicated, the meter apparatus requires in addition to the protection offered by the enclosure assembly 10, frequent chart re-calibration, chart drive repair and parts replacement as well as servicing in general. The enclosure assembly 10 must therefore accommodate the frequent servicing necessary for the meter apparatus.

The enclosure assembly 10 is supported about the meter apparatus 20 on the flow line 14 by means of a frame assembly generally referred to by reference numeral 24. The frame assembly includes a plurality of spaced post members 26, 28, 30 and 32 formed of angle iron the bottom ends of which are secured to the flow line 14 by any suitable fasteners such as the U-bolts 34 connected to base frame members 36 which interconnect the post members disposed on opposite sides of the flow line 14 as more clearly seen in FIGURE 3. Interconnecting the post members 26 and 28 on one side of the flow line 14 and post members 30 and 32 on the other side of the flow line 14, are a pair of parallel floor receiving frame members 38 vertically spaced above the flow line 14. Accordingly, supported by the floor receiving frame members 38 between the post members, is a floorboard 40 the top surface of which constitutes a workbench when exposed. As more clearly seen in FIGURE 1, each of the post members includes a portion 42 which projects above the floor member 40. The portion 42 is provided with a pair of vertically spaced pivot receiving apertures including lower pivot apertures 44 and upper slotted apertures 46. The upper slot apertures 46 thus permit displacement with respect to the lower pivot apertures 44 by a small amount for purposes apparent hereafter.

Figure 4:
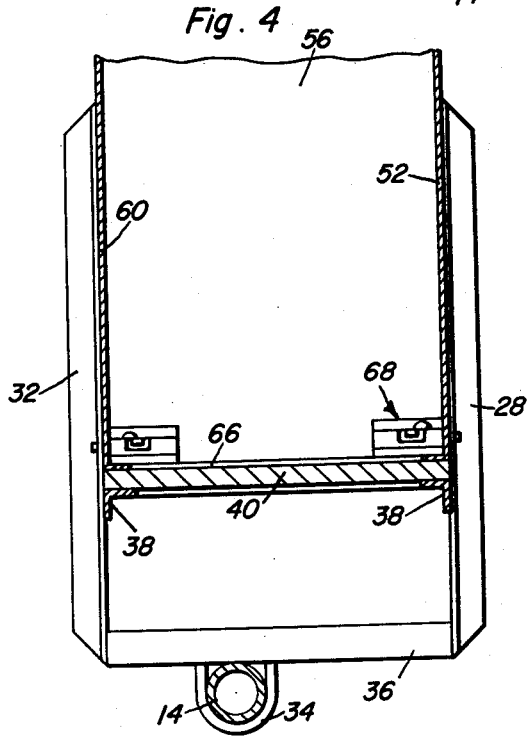
FIGURE 4 is a partial sectional view taken substantially through a plane indicated by section line 4—4 in FIGURE 1.
Figure 5:
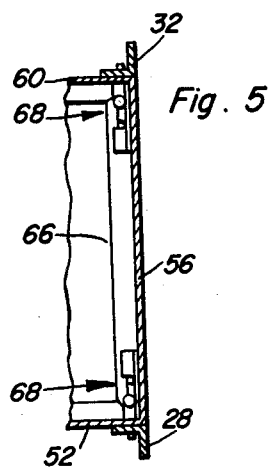
FIGURE 5 is a partial sectional view taken substantially through a plane indicated by section line 5—5 in FIGURE 1.

Supported by the portions 42 of the post members is the enclosure housing generally referred to by reference numeral 48. The housing includes a top wall 50 having a slight rearward incline as more clearly seen in FIGURE 3. Connected to the top wall 50, is a front wall 52 having a door receiving opening 54. Connected to both the front wall and the top wall, are side walls 56 and 58. Finally, the housing 48 is completed by a back wall 60. The housing when supported above the floor member 40 will therefore completely enclose the portions of the meter apparatus to be protected with the conduit connections thereto extending downwardly through the floorboard member 40 to the meter 12. The front wall opening 54 may therefore be closed by an inspection door 62 having any suitable lock device 64. When supported above the floorboard 40, the housing 48 extends between the post members in a horizontal plane and vertically above the post members a sufficient distance to clear the top of the meter apparatus 20. The bottom 66 of the housing 48 is therefore open as more clearly seen in FIGURES 4 and 5.

Figure 6:
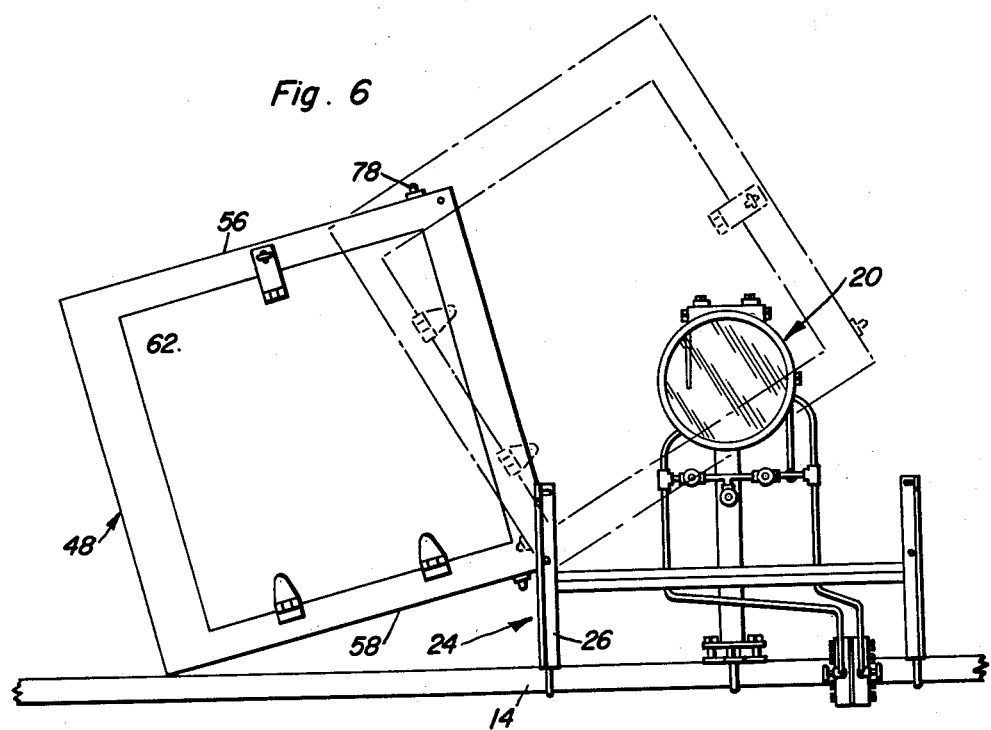
FIGURE 6 is a front elevational view of the enclosure assembly illustrated in a meter exposing position with respect to a lower supported position.

Mounted on each of the side walls 56 and 58 adjacent the bottom 66 of the housing, are a pair of axially aligned releasable pivot securing assemblies each of which is generally referred to by reference numeral 68 as more clearly seen in FIGURE 8. The pivot securing assemblies 68 therefor include a slide housing 70 fixed to the side wall 56 or 58 within which a barrel bolt pivot member 72 is slidable, the bolt member 72 projecting through an aperture 74 formed in the front and back walls 52 and 60. The barrel bolt 72 is therefore provided with an actuating knob element 76 by means of which the bolt 72 may be projected through the aperture 74 for reception within one of the spaced apertures 44 or 46 in the projecting portions 42 of the frame post members. The bolt member 72 may also be withdrawn and locked in withdrawn position by means of the knob 76 from the position illustrated in FIGURE 8. It will therefore be apparent, that when all of the pivot bolts 72 of the assemblies 68 are in their extended positions in engagement with the lower apertures 44 in the frame post members, the housing 48 will be rigidly secured to the frame assembly 24 in the position illustrated in FIGURE 1. Should it become necessary to service the meter apparatus 20, the housing 48 may be partially released from the frame assembly 24 by withdrawing the pivot bolts of the assemblies mounted on the side wall 56 by merely opening the door 62 to the housing and grasping the bolt knobs 76. The housing 48 may then be pivotally displaced about the pivot bolt assemblies 68 mounted on the side wall 58 and projecting through the front and back walls for engagement with the lower apertures 44 of the post members 26 and 30. Pivotal displacement of the housing 48 will be limited to a meter exposing position as illustrated in FIGURE 6 by solid line wherein the housing rests on top of the fluid flow line 14. In order to effect the pivotal displacement aforementioned, a handle 78 is secured to the side wall bottom end of the housing.

As illustrated in FIGURE 6, pivotal displacement of the housing 48 with respect to the axially aligned pivot assemblies 68 which are engaged with the frame assembly, may safely be accomplished when the bottom opening of the housing clears the meter apparatus enclosed within the housing. Should the clearance be insufficient however, to permit pivotal displacement of the housing to the meter apparatus exposing position, a modified procedure will be necessary. Referring therefore to FIGURE 7 in particular, it will be observed that the housing 48 may first be pivotally displaced with respect to the lower pivot apertures 44 on the post members 26 and 30 for example until the released pivot bolt assemblies 68 are aligned with the upper apertures 46 on the opposite post members 28 and 32. The released pivot bolt assemblies 68 may then be engaged with the upper apertures 46 to secure and support the housing to the frame assembly in vertically spaced relation above the floor member 40. Thereafter, the aligned pivot bolt assemblies 68 engageable with the lower apertures 44 on the post members 26 and 30 may be released so that the housing 48 may then be pivotally displaced with respect to the pivot bolt assemblies engaged with the upper apertures 46 to the meter exposing position as illustrated in solid line in FIGURE 7. Clearance of a larger size meter apparatus is thereby assured. A handle 78 is therefore also secured to the side 58 of the housing 48 adjacent the open bottom 66 thereof.

From the foregoing description, the construction and utility of the novel meter enclosure assembly of the present invention will be apparent. It will therefore be appreciated, that the enclosure assembly of the present invention is installed about meter apparatus by mounting of the frame assembly 24 on the flow line pipe 14 straddling the location at which the meter apparatus is to be installed. The meter is then installed and all the connections made. Next, the floor 40 is fitted on the frame and held in place when the housing 48 is finally locked in position as illustrated in FIGURE 1. The housing 48 will moreover not be releasable from the enclosing position without prior unlocking of the door 62 providing access to the pivot bolt assemblies 68 by means of which one or the other lower end of the housing may be released for pivotal displacement to a meter exposing position providing unobstructed work area on the workbench surface formed by the floor member 40. Furthermore, the releasable pivot bolt assemblies 68 permit the housing 48 to be completely removed should that become necessary. Nevertheless, removal of the housing assembly would still require opening of the inspection door 62 which would thereby prevent unauthorized removal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A protective enclosure for apparatus such as meters or the like comprising, frame means, floor means mounted in the frame means, housing means supported by the frame means above the floor means, and releasable securing means operatively connected to the housing means and the frame means for adjustably spaced support and limited displacement of the housing means with respect to the frame means to facilitate exposure and servicing of enclosed apparatus, said housing means including interconnected side and top walls defining an open bottom adjustably supported in spaced relation above the floor means for displacement of the housing means to an apparatus exposing position without interference with said enclosed apparatus, said frame means comprising, floor receiving means, spaced post means fixedly connected in spaced relation to said floor receiving means and including portions projecting thereabove, said portions having means operatively engageable with said releasable securing means for adjustably spaced support of the housing means.

2. The combination of claim 1, including handles connected to opposite side walls adjacent said open bottom of said housing means for displacement thereof to an apparatus exposing position upon release of said releasable securing means.

3. A protective enclosure for apparatus such as meters or the like comprising, frame means, floor means mounted in the frame means, housing means supported by the frame means above the floor means, and releasable securing means operatively connected to the housing means and the frame means for adjustably spaced support and limited displacement of the housing means with respect to the frame means to facilitate exposure and servicing of enclosed apparatus, said housing means including interconnected side and top walls defining an open bottom adjustably supported in spaced relation above the floor means for displacement of the housing means to an apparatus exposing position without interference with said enclosed apparatus, said frame means comprising, floor receiving means, spaced post means fixedy connected in spaced relation to said floor receiving means and including portions projecting thereabove for adjustably spaced support of the housing means, handles connected to opposite side walls adjacent said open bottom for displacement of said housing means to an apparatus exposing position upon release of said releasable securing means, said releasable securing means including a plurality of spaced pivot means movably mounted within said housing means and projecting therefrom for engagement with said frame means, a plurality of vertically spaced apertures formed on said projecting portions of said frame means for receiving said pivot means to secure said housing means thereto and selective releasing means connected to said pivot means for selective withdrawal of axially aligned pivot means from associated apertures to permit pivotal displacement of the housing means with respect to other axially aligned pivot means.

4. A protective enclosure for apparatus such as meters or the like comprising, frame means, floor means mounted in the frame means, housing means supported by the frame means above the floor means, and releasable securing means operatively connected to the housing means and frame means for adjustably spaced support and limited displacement of the housing means with respect to the frame means to facilitate exposure and servicing of enclosed apparatus, said frame means comprising, floor receiving means, spaced post means fixedly connected in spaced relation to said floor receiving means and including portions projecting thereabove, said portions having means operatively engageable with said releasable securing means for adjustably spaced support of the housing means.

5. A protective enclosure for apparatus such as meters or the like comprising, frame means, floor means mounted in the frame means, housing means supported by the frame means above the floor means, and releasable securing means operatively connected to the housing means and frame means for adjustably spaced support and limited displacement of the housing means with respect to the frame means to facilitate exposure and servicing of enclosed apparatus, said frame means comprising, floor receiving means, spaced post means fixedly connected in spaced relation to said floor receiving means and including portions projecting thereabove for adjustably spaced support of the housing means, said releasable securing means including a plurality of spaced pivot means movably mounted within said housing means and projecting therefrom for engagement with said frame means, a plurality of vertically spaced apertures formed on said projecting portions of said frame means for receiving said pivot means to secure said housing means thereto and selective releasing means connected to said pivot means for selective withdrawal of axially aligned pivot means from associated apertures to permit pivotal displacement of the housing means with respect to other axially aligned pivot means.

6. A protective enclosure for apparatus such as meters or the like comprising, frame means, floor means mounted in the frame means, housing means supported by the frame means above the floor means, and releasable securing means operatively connected to the housing means and frame means for adjustably spaced support and limited displacement of the housing means with respect to the frame means to facilitate exposure and servicing of enclosed apparatus, said releasable securing means including a plurality of spaced pivot means movably mounted within said housing means and projecting therefrom for engagement with said frame means, a plurality of vertically spaced apertures formed on said frame means for receiving said pivot means to secure said housing means thereto and selective releasing means connected to said pivot means for selective withdrawal of axially aligned pivot means for associated aperturees to permit pivotal displacement of the housing means with respect to other axially aligned pivot means.

7. The combination of claim 6 wherein said housing means includes handles connected to opposite side walls adjacent said open bottom for displacement of said housing means to an apparatus exposing position upon withdrawal of said selected pivot means.

References Cited in the file of this patent
UNITED STATES PATENTS
2,561,007     Bierig _____ July 17, 1951